United States Patent
Tanikawa et al.

(10) Patent No.: US 9,307,486 B2
(45) Date of Patent: Apr. 5, 2016

(54) USER EQUIPMENT AND RECONNECTION METHOD FOR MOBILE COMMUNICATIONS SYSTEM

(71) Applicant: NTT DOCOMO, INC., Chiyoda-ku (JP)

(72) Inventors: Hiroaki Tanikawa, Chiyoda-ku (JP); Shinya Takeda, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 14/391,438

(22) PCT Filed: Apr. 24, 2013

(86) PCT No.: PCT/JP2013/062065
§ 371 (c)(1),
(2) Date: Oct. 9, 2014

(87) PCT Pub. No.: WO2013/187135
PCT Pub. Date: Dec. 19, 2013

(65) Prior Publication Data
US 2015/0111571 A1    Apr. 23, 2015

(30) Foreign Application Priority Data

Jun. 11, 2012    (JP) .................................. 2012-132173

(51) Int. Cl.
*H04W 4/00* (2009.01)
*H04W 36/00* (2009.01)
*H04W 48/16* (2009.01)
(Continued)

(52) U.S. Cl.
CPC .............. *H04W 48/16* (2013.01); *H04W 36/00* (2013.01); *H04W 36/14* (2013.01); *H04W 60/00* (2013.01)

(58) Field of Classification Search
None
See application file for complete search history.

(56) References Cited

U.S. PATENT DOCUMENTS

2007/0249291 A1    10/2007    Nanda et al.
2011/0158165 A1    6/2011    Dwyer et al.
(Continued)

FOREIGN PATENT DOCUMENTS

JP    2009-534952    9/2009
JP    2011-239032    11/2011
WO    2008/102531    8/2008

OTHER PUBLICATIONS

International Search Report Issued Jul. 23, 2013 in PCT/JP13/062065 filed Apr. 24, 2013.
"LTE neighborhood list and measurement organisation", 3GPP TSG-RAN WG2#56, R2-063189, Siemens, (4 pages), 2006.
(Continued)

*Primary Examiner* — Erika A Washington
(74) *Attorney, Agent, or Firm* — Oblon, McClelland, Maier & Neustadt, L.L.P.

(57) ABSTRACT

User equipment includes a cell search unit configured to execute a cell search; a detector configured to detect that reconnection is required; a storage unit configured to store VoIP support information that indicates, for each type of radio communications system (RAT), whether voice packet communication is allowed; a cell search target determination unit configured to refer to the VoIP support information and report only the type of the radio communications system (RAT) for which the voice packet communication is allowed to the cell search unit as a target of the cell search, when the detector detects that the reconnection is required for the voice packet communication; and a communication unit configured to communicate in a cell that is detected by the cell search.

7 Claims, 3 Drawing Sheets

(51) Int. Cl.
*H04W 36/14* (2009.01)
*H04W 60/00* (2009.01)

(56) References Cited

U.S. PATENT DOCUMENTS

2012/0039213 A1    2/2012  Cheng et al.
2013/0044709 A1*   2/2013  Adjakple et al. .............. 370/329

OTHER PUBLICATIONS

"3$^{rd}$ Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.3.0, Technical Specification, (344 pages), 2013.
Extended Search Report issued Feb. 5, 2016 in European Patent Application No. 13803693.4.

* cited by examiner

| NW OPERATOR (PLMN) | RAT | |
| --- | --- | --- |
| | 3G | LTE |
| OPERATOR A | YES | YES |
| OPERATOR B | NO | YES |
| OPERATOR C | NO | NO |
| ... | ... | ... |

USER EQUIPMENT AND RECONNECTION METHOD FOR MOBILE COMMUNICATIONS SYSTEM

TECHNICAL FIELD

The present invention relates to user equipment and a reconnection method for a mobile communications system.

BACKGROUND ART

In a mobile communications system, whose specification is defined by the third generation partnership project (3GPP), when a detection is made that a mobile station moves out from a coverage area of a cell, a cell search is executed so as to return to a coverage area. The fact that the mobile station moves out from the coverage area can be determined, for example, by degradation of radio quality. During returning to the coverage area, the mobile station executes a cell search, and the mobile station attempts to re-establish a connection to a network in a detected cell in which the mobile station can be served. Such processing is referred to as "reconnection."

The 3GPP standard specifications do not define any detailed method of a cell search that is to be executed during reconnection, and it is left to implementation of each mobile station. For example, suppose that a mobile communications provider (operator) provides a service based on a long term evolution (LTE) scheme and a service based on a 3G scheme. When a mobile station that is communicating in the LTE requires reconnection, the mobile station can execute a cell search for the LTE and a cell search for the 3G. In this case, it depends on implementation of the mobile station as to what time allocation and as to what order the cell search for the LTE and the cell search for the 3G are to be executed. However, a time period for the reconnection (including a time period for the cell search) is defined as a reconnection timer in the 3GPP specifications, and when the reconnection timer expires, a call is disconnected. Patent Document 1 discloses the reconnection and the like.

RELATED ART DOCUMENT

Patent Document

[Patent Document 1] Japanese Unexamined Patent Publication No. 2011-239032

SUMMARY OF THE INVENTION

Problem to be Solved by the Invention

An object of the present invention is at least to mitigate a problem such that, when an attempt is made to establish reconnection for voice packet communications, a call is disconnected at an early stage.

Means for Solving the Problem

According to an embodiment of the present invention, there is provided user equipment including a cell search unit configured to execute a cell search; a detector configured to detect that reconnection is required; a storage unit configured to store VoIP support information that indicates, for each radio communication system (RAT), whether voice packet communication is allowed; a cell search target determination unit configured to refer to the VoIP support information and report only the RAT for which the voice packet communication is allowed to the cell search unit as a target of the cell search, when the detector detects that the reconnection is required for the voice packet communication; and a communication unit configured to communicate in a cell that is detected by the cell search.

According to another embodiment, there is provided a reconnection method to be executed by user equipment, wherein the method includes a step of referring to, when reconnection is required for voice packet communication, VoIP support information that indicates, for each type of radio communications system (RAT), whether voice packet communication is allowed; a step of reporting only the type of the radio communications system (RAT) for which the voice packet communication is allowed to a cell search unit as a target of a cell search; and a step of communicating in a cell that is detected by the cell search.

Effect of the Present Invention

According to the present invention, it is possible, at least, to mitigate the problem such that, when an attempt is made to establish reconnection for voice packet communications, a call is disconnected at an early stage.

EMBODIMENTS FOR CARRYING OUT THE INVENTION

Figures 1, 2:
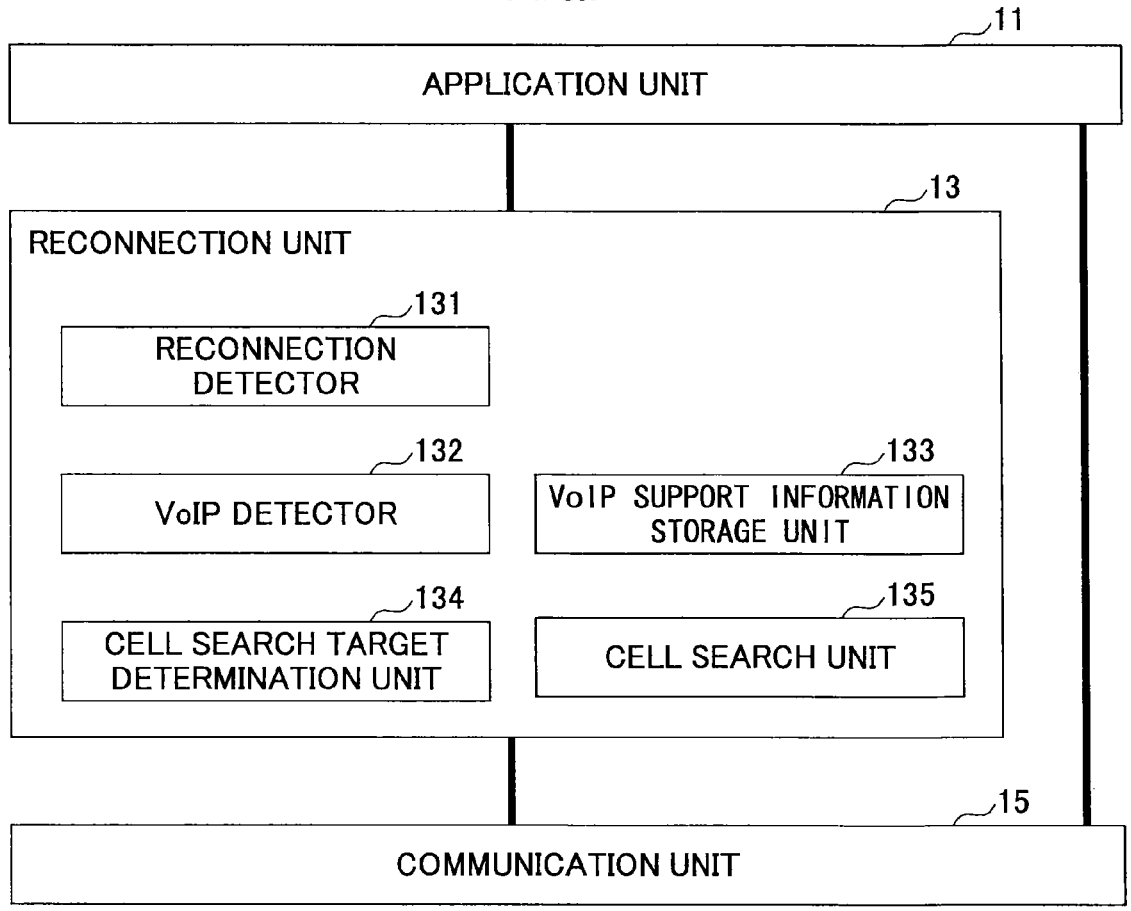
FIG. 1 is a functional block diagram of user equipment.
FIG. 2 is a diagram showing an example of VoIP support information.

Both the LTE and the 3G provide services for packet switch calls for data communications. For example, when a mobile station attempts to establish reconnection in the LTE, the mobile station may establish reconnection to a LTE cell or to a 3G cell. For example, first, a mobile station may execute a cell search for the LTE, and if no suitable cell is found within a predetermined time period, the mobile station may execute a cell search for the 3G. When a cell is detected in which the mobile station can be served, a connection is established to the cell, and the data communications can be continued (returned) by transitioning to the cell.

In contrast, a situation is different for packet switch calls for voice communications (which are referred to as Voice over Internet Protocol (VoIP) or voice packets, hereinafter) from that of the packet switch call for data communications. In order to allow VoIP communications, a system, which is referred to as the IP Multimedia Subsystem (IMS), is to be supported by a network. The situation is different because whether or not to support IMS is not defined in the 3GPP standard specifications, and it may depend on each radio communication system (Radio Access Technology: RAT). Accordingly, for example, when a mobile station that is executing VoIP communications in an LTE cell attempts to establish reconnection, the mobile station may find a 3G cell with which the VoIP communication is disallowed, and the mobile station may attempt to transition to the 3G cell. In such a case, a problem is such that, since the VoIP communications are disallowed in the 3G cell to be transitioned to in the first place, at a moment at which an attempt is made to transition from the LTE cell to the 3G cell, a call is disconnected regardless of a reconnection timer.

An embodiment is explained from the following perspectives by referring to the accompanying drawings. In the figures, to each set of similar elements, the same reference number or the same reference numeral is attached.

1. User equipment
2. Operation example
2.1 Retrieval of VoIP support information
2.2 Reconnection The separations of the items are not essential to the present invention. Depending on necessity, subject matter described in two or more items may be combined and used, and subject matter described in an item may be applied to subject matter described in another item (provided that they do not contradict).

<1. User Equipment>

FIG. 1 shows a functional block diagram of user equipment (UE) that can be used in the embodiment of the present invention. FIG. 1 shows processing units or functional units that are particularly relevant to the embodiment, among various processing units or functional units included in the user equipment. The user equipment (UE) can execute communications both in a 3G mobile communications system and in an LTE mobile communications system. Typically, the user equipment (UE) can be a mobile phone. However, the user equipment (UE) may be another device. For example, the user equipment (UE) may be an information terminal, an enhanced mobile telephone, a smartphone, a tablet type computer, a personal digital assistant (PDA), a mobile personal computer, a palmtop computer, a laptop computer, and so forth. However, the user equipment is not limited to these. FIG. 1 shows an application unit 11; a reconnection unit 13; and a communication unit 15.

The application unit 11 is for executing a process of an application that runs on the user equipment (UE). In the present specification, the application may refer to a concept including software and programs.

The reconnection unit 13 is for executing a process of reconnection. The reconnection unit 13 may include a reconnection detector 131; a VoIP detector 132; a VoIP support information storage unit 133; a cell search target determination unit 134; and a cell search unit 135.

The reconnection detector 131 is for detecting whether user equipment (UE) is required to execute a process of reconnection. For example, it may be confirmed as to whether or not the reconnection is required by detecting an event, such as an event that quality of a signal that is received by the user equipment (UE) is deteriorated to be less than a predetermined value. That is because, when the user equipment (UE) moves out of the range of communications, quality of the received signal is significantly deteriorated.

The VoIP detector 132 is for detecting whether communications executed by user equipment (UE) is a packet switch call for voice communications (VoIP). For convenience of the explanation, the reconnection detector 131 and the VoIP detector 132 are depicted as separate processing units. However, such a configuration is not required. In short, it suffices if it is possible to detect whether the reconnection is required for the VoIP communications.

The VoIP support information storage unit 133 is for storing, for each type of radio communications system (RAT), VoIP support information that indicates whether VoIP communications are allowed. To allow VoIP communications in a RAT, it is required that the RAT includes an IP Multimedia Subsystem (IMS). There are some RATs including the IMS, and there are some RATs not including the IMS. During a UE attach procedure or during location registration, the VoIP support information is reported from a network, and the VoIP support information is updated. During an attach procedure in the LTE or during location registration in the LTE, the network reports as to whether the LTE is supported. During an attach procedure in the 3G or during location registration in the 3G, the network reports as to whether the 3G is supported.

FIG. 2 shows an example of the VoIP support information. In the figure, "YES" indicates that the VoIP communications are allowed (the IMS is implemented). "NO" shows that the VoIP communications are disallowed (the IMS is not implemented). The public land mobile network (PLMN) indicates a mobile communications system that is operated by an operator. For the depicted example, the operators A, B and C are providing 3G services and LTE services. For the case of the operator A, the VoIP communications are allowed for both of them. For the case of the operator B, the VoIP communications are disallowed for the 3G, but the VoIP communications are allowed for the LTE. For the case of the operator C, the VoIP communications are disallowed for both of them. The depicted example is for exemplifying purpose only.

When the reconnection detector 131 and the VoIP detector 132 detects that the reconnection is required for the VoIP communications, the cell search target determination unit 134 of FIG. 1 refers to the VoIP support information, and the cell search target determination unit 134 reports only the RAT for which the VoIP communications are allowed to the cell search unit 135 as a target of the cell search. For example, suppose that reconnection is required during execution of VoIP communications, by user equipment (UE), in an LTE mobile communications system of the operator B. In this case, the cell search target determination unit 134 reports to the cell search unit 135 that the 3G mobile communications system and the LTE mobile communications system of the operator A for which the VoIP communications are allowed are included in a target of the cell search, and that the mobile communications systems of the operator C are not included in the target of the cell search. That is because the VoIP communications are not allowed for the mobile communications systems of the operator C.

The cell search unit 135 executes a cell search only for the target of the cell search that is determined by the cell search target determination unit 134. For the case of the above-described example, the user equipment (UE) executes the cell search only for the 3G and LTE mobile communications systems of the operator A for which the VoIP communications are allowed. The mobile communications systems of the operator C is out of the target of the cell search. Consequently, the problem can be avoided that, when an attempt is made to establish the reconnection for the VoIP communications, an attempt is made to transition to a cell for which the VoIP communications are disallowed in the first place, and a call is disconnected at an early stage prior to the expiration of the reconnection timer.

The communication unit 15 can continue executing the VoIP communications by establishing a connection to the cell that is detected by the cell search that is executed by the cell search unit 135.

<2. Operation Example><<2.1 Retrieval of the VoIP Support Information>>

Figure 3:
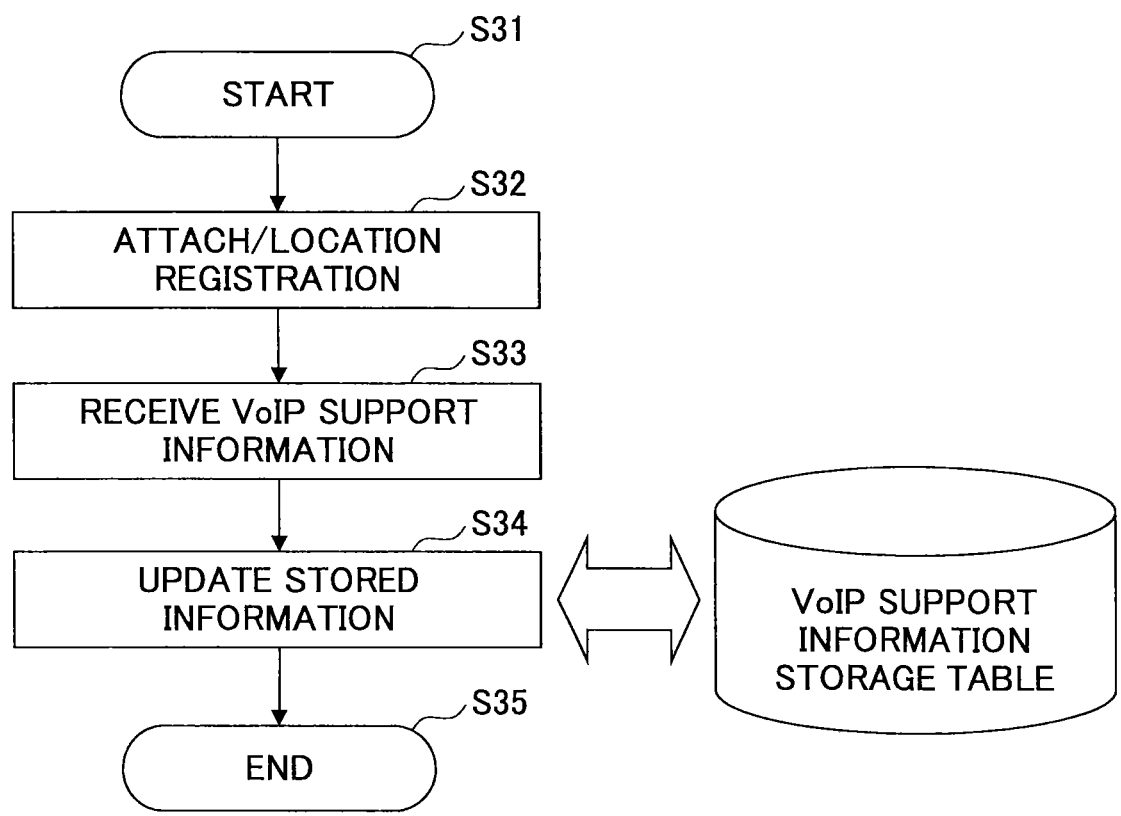
FIG. 3 is a flowchart showing an operation example for retrieving the VoIP support information.

FIG. 3 shows an operation flow of user equipment (UE), such as shown in FIG. 1, to retrieve the VoIP support information. The operation flow starts at step S31, and the operation flow proceeds to step S32.

At step S32, an attach procedure or location registration is executed for the user equipment (UE). For example, during turn on of the power supply or during handover, subscriber information and the like of the user equipment (UE) is registered to a switching center.

At step S33, the user equipment (UE) retrieves the VoIP support information from a communication node (e.g., a switching center) of the network. As shown in FIG. 2, the VoIP support information indicates, for each radio communications system (RAT), whether voice packet communications are allowed.

At step S34, the user equipment (UE) stores the VoIP support information that is retrieved from the communication node of the network in the VoIP support information storage unit 133. In this case, the information that is already stored in the VoIP support information storage unit 133 is updated with the newly received VoIP support information.

The operation flow proceeds to step S35, and the operation flow is terminated.

<<2.2 Reconnection>>

Figure 4:
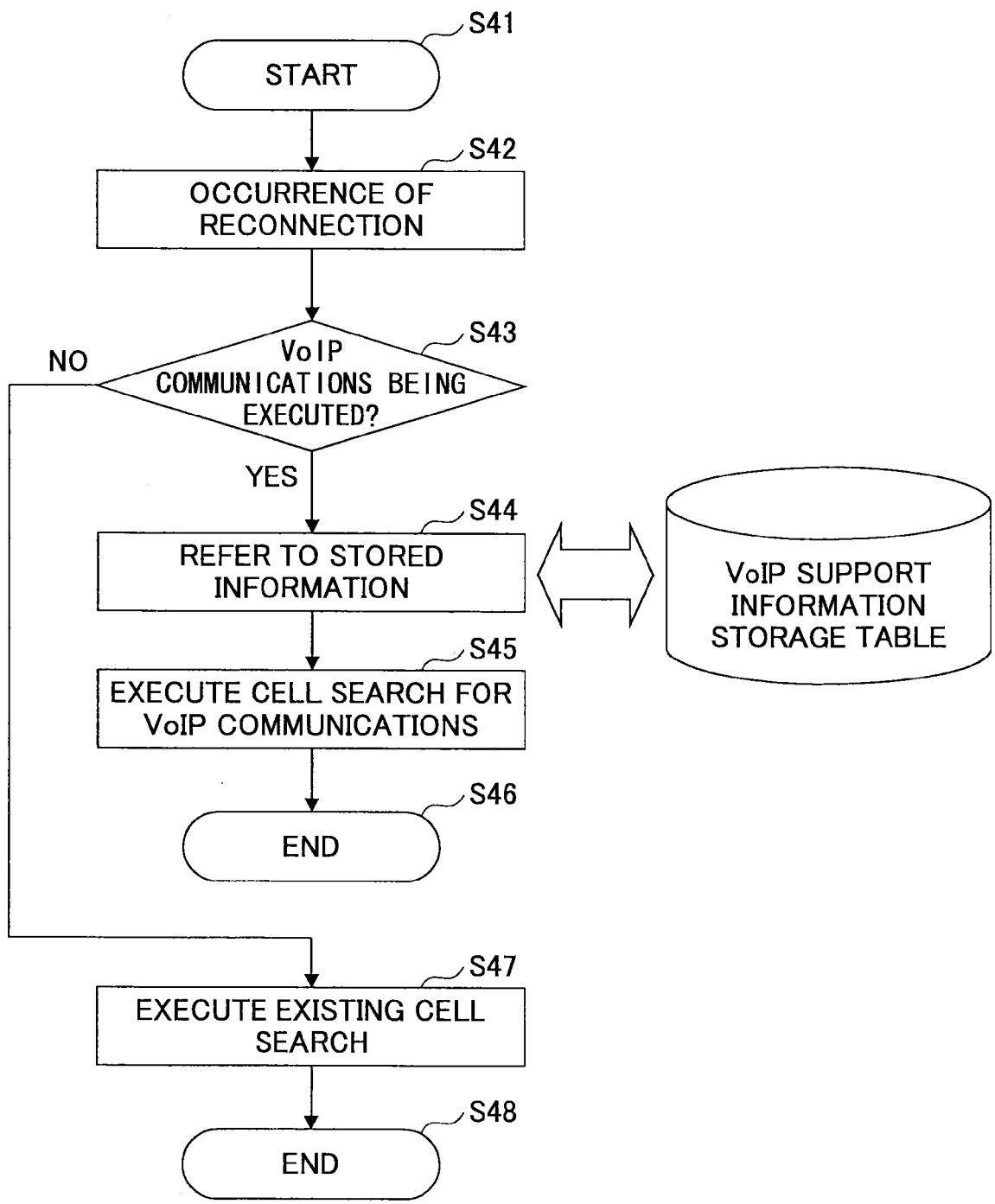
FIG. 4 is a flowchart showing an operation example for establishing reconnection.

FIG. 4 shows an operation flow for establishing reconnection by user equipment (UE), such as shown in FIG. 1. The operation flow starts at step S41, and the operation flow proceeds to step S42.

At step S42, the user equipment UE detects that the reconnection is required, for example, by deterioration of the received quality.

At step S43, the user equipment (UE) detects whether or not the VoIP communications are being executed. When the VoIP communications are being executed (YES), the operation flow proceeds to step S44.

At step S44, the user equipment (UE) refers to the VoIP support information that is stored in the VoIP support information storage unit 133, and the user equipment (UE) only reports the RAT for which the VoIP communications are allowed to the cell search unit 135. The VoIP support information is stored in the VoIP support information storage unit 133 by the operation example of FIG. 3.

At step S45, the cell search unit 135 of the user equipment executes a cell search that is limited to the reported target. After that, the user equipment (UE) executes communications in the detected cell, the operation flow proceeds to step S46, and the operation flow is terminated.

When the VoIP communications are not being executed at step S43 (NO), the operation flow proceeds to step S47.

At step S47, the cell search unit 135 of the user equipment executes a cell search for a candidate cell that can be connected, regardless of whether the VoIP communications are allowed or not. After that, the user equipment (UE) executes communications in the detected cell, the operation flow proceeds to step S48, and the operation flow is terminated.

In this manner, according to this embodiment, even if, in a mobile communications system, VoIP support of a packet switch domain differs depending on a RAT, a cell search operation of user equipment can be optimized when reconnection occurs during execution of VoIP communications. A cell search for establishing reconnection during VoIP communications can be executed as an optimum operation for the VoIP, so that enhancement of connection quality of the VoIP can be expected.

The user equipment and the reconnection method of the mobile communications system are explained above by the specific embodiment exemplifying the LTE and 3G communications systems. However, the present invention is not limited to the embodiment, and various modifications and improvements may be made within the scope of the present invention. For example, the present invention may be applied to any suitable mobile communications system that allows execution of VoIP communications. Specific examples of numerical values are used in order to facilitate understanding of the invention. However, these numerical values are simply illustrative, and any other appropriate values may be used, except as indicated otherwise. The separations of the items in the above-described explanation are not essential to the present invention. Depending on necessity, subject matter described in two or more items may be combined and used, and subject matter described in an item may be applied to subject matter described in another item (provided that they do not contradict). A boundary of a functional unit or a processing unit in a functional block is not necessarily corresponds to a boundary of a physical component. An operation by a plurality of functional units may be physically executed by a single component. Alternatively, an operation by a single functional unit may be physically executed by a plurality of components. For the convenience of explanation, the devices according to the embodiment of the present invention are explained by using the functional block diagrams. However, these devices may be implemented in hardware, software, or combinations thereof. The software that operates in accordance with the present invention may be prepared in any appropriate storage medium, such as a random access memory (RAM), a flash memory, a read-only memory (ROM), an EPROM, an EEPROM, a register, a hard disk drive (HDD), a removable disk, a CD-ROM, a database, a server, and the like.

The present application is based on and claims the benefit of priority of Japanese Patent Application No. 2012-132173, filed on Jun. 11, 2012, the entire contents of Japanese Patent Application No. 2012-132173 are hereby incorporated by reference.

LIST OF REFERENCE SYMBOLS

11: Application unit
13: Reconnection unit
131: Reconnection detector
132: VoIP detector
133: VoIP support information storage unit
134: Cell search target determination unit
135: Cell search unit
15: Communication unit

The invention claimed is:

1. A user equipment comprising:
a cell search unit configured to execute a cell search;
a detector configured to detect that reconnection is required;
a storage unit configured to store voice over IP (VoIP) support information that indicates, for each of a plurality of operators, whether voice packet communication is allowed for each of a first mobile communication system, as a first radio access technology (RAT), in which communication is executed in accordance with a first radio access scheme and a second mobile communication system, as a second RAT, in which communication is executed in accordance with a second radio access scheme;
a cell search target determination unit configured to report, to the cell search unit, only one or more RATs that allow the voice packet communication of the first RATs and the second RATs that are operated by the operators as a target of the cell search by referring to the VoIP support information, in response to determining, by the detector, that the reconnection is required for the voice packet communication; and
a communication unit configured to communicate in a cell that is detected by the cell search, wherein the VoIP support information is reported from a switching center of a network during location registration or an attach procedure, and the VoIP support information is stored in the storage unit.

2. The user equipment according to claim 1,
wherein the first RAT is a 3G mobile communications system and the second RAT is an LTE communications system.

3. The user equipment according to claim 1,
wherein the VoIP support information of the first RAT is obtained during location registration or an attach operation with respect to the first RAT, and the VoIP support information of the second RAT is obtained during location registration or an attach operation with respect to the second RAT.

4. A reconnection method to be executed by user equipment, wherein the method comprises:
a step of storing voice over IP (VoIP) support information that indicates, for each of a plurality of operators, whether voice packet communication is allowed for each of a first mobile communication system, as a first radio access technology (RAT), in which communication is executed in accordance with a first radio access scheme and a second mobile communication system, as a second RAT, in which communication is executed in accordance with a second radio access scheme;
a step of reporting, to a cell search unit only one or more RATs that allow the voice packet communication of the first RATs and the second RATs that are operated by the operators as a target of a cell search by referring to the VoIP support information, in response to determining that reconnection is required for the voice packet communication; and
a step of communicating in a cell that is detected by the cell search,
wherein the VoIP support information is reported from a switching center of a network during location registration or an attach procedure, and the VoIP support information is stored in a storage unit.

5. The reconnection method according to claim 4,
wherein the first RAT is a 3G mobile communications system and the second RAT is an LTE communications system.

6. The user equipment according to claim 4,
wherein the VoIP support information of the first RAT is obtained during location registration or an attach operation with respect to the first RAT, and the VoIP support information of the second RAT is obtained during location registration or an attach operation with respect to the second RAT.

7. A user equipment comprising:
a memory; and
circuitry configured to
execute a cell search;
detect that reconnection is required;
store, to the memory, voice over IP (VoIP) support information that indicates, for each of a plurality of operators, whether voice packet communication is allowed for each of a first mobile communication system, as a first radio access technology (RAT), in which communication is executed in accordance with a first radio access scheme and a second mobile communication system, as a second RAT, in which communication is executed in accordance with a second radio access scheme;
report only one or more RATs that allow the voice packet communication of the first RATs and the second RATs that are operated by the operators as a target of the cell search by referring to the VoIP support information, in response to determining that the reconnection is required for the voice packet communication; and
communicate in a cell that is detected by the cell search,
wherein the VoIP support information is reported from a switching center of a network during location registration or an attach procedure, and the VoIP support information is stored in the memory.

* * * * *